March 26, 1963   L. M. BUMM ET AL   3,082,589
HAY CONDITIONER
Filed Nov. 21, 1960
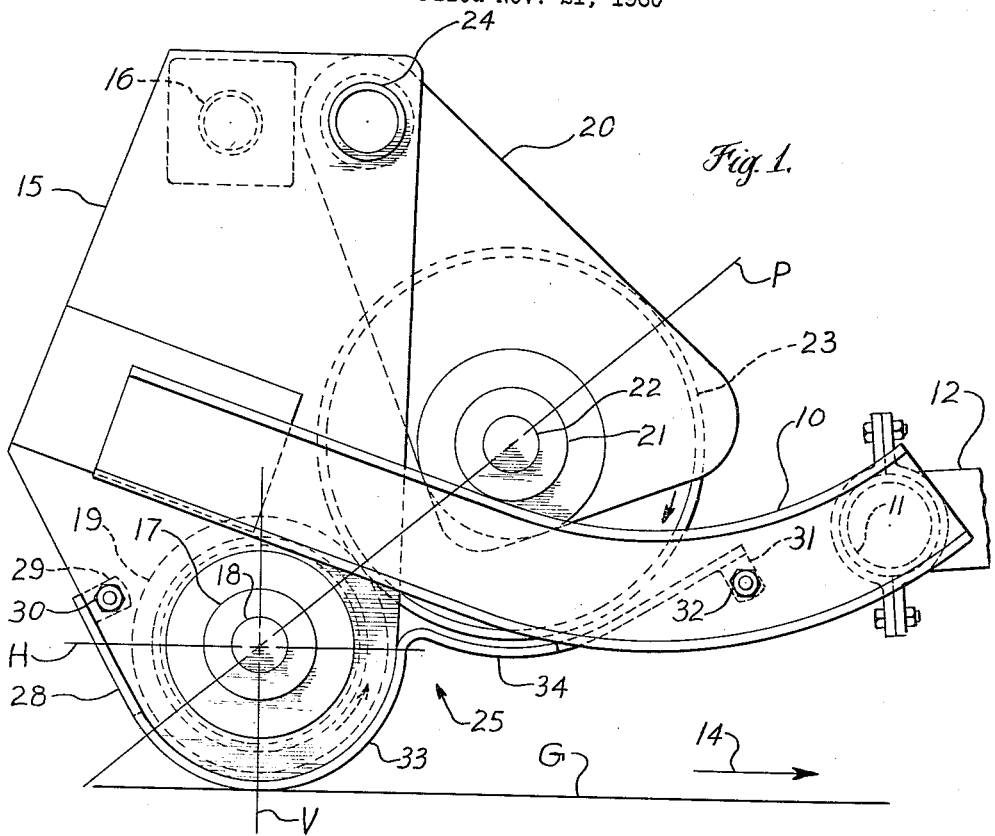
Fig. 1.
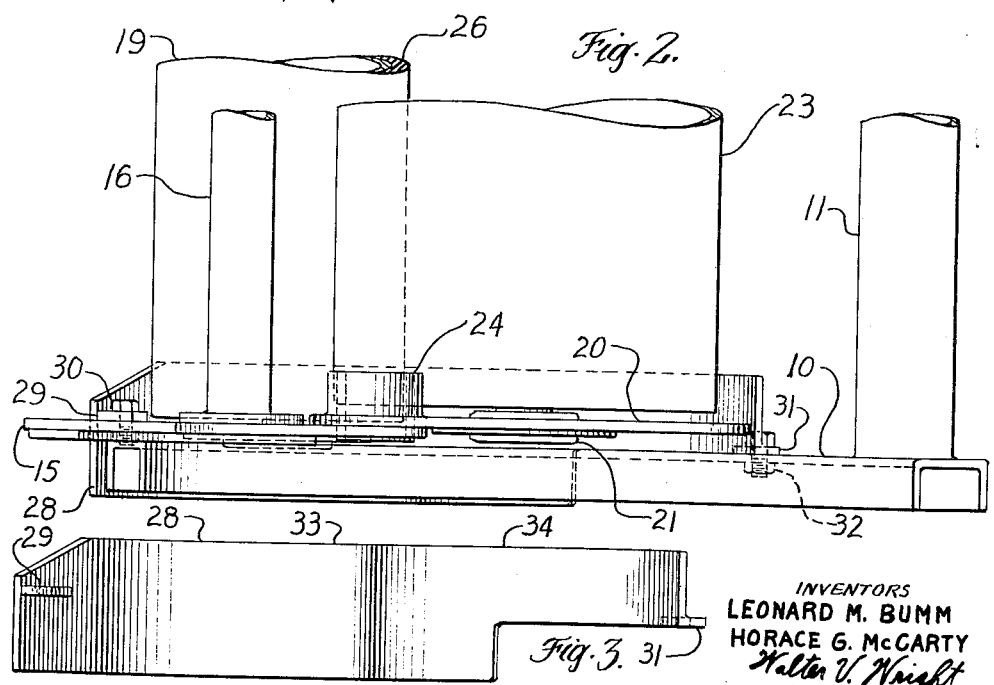
Fig. 2.
Fig. 3.
INVENTORS
LEONARD M. BUMM
HORACE G. McCARTY
Walter V. Wright
AGENT United States Patent Office 3,082,589
Patented Mar. 26, 1963

3,082,589
HAY CONDITIONER
Leonard M. Bumm, Blue Ball, and Horace G. McCarty, New Holland, Pa., assignors to Sperry Rand Corporation, New Holland, Pa., a corporation of Delaware
Filed Nov. 21, 1960, Ser. No. 70,674
4 Claims. (Cl. 56—1)

This invention relates to hay conditioners and constitutes an improvement therein.

Hay conditioners have come into wide use as a means for reducing the time required for hay, or similar crops, to dry in the field after being mowed. The function of the hay conditioner is to crack open the highly moist stems of the crop to expose the interior thereof to the drying effects of the air and sun. To accomplish this, hay conditioners comprise a pair of rolls mounted on a mobile frame adapted to be towed through a field of cut crop material. The rolls may have relatively smooth peripheries or corrugated peripheries between which the crop is passed to perform the stem crushing or cracking operation as the conditioner is towed through a field. One such machine is shown in U.S. Patent No. 2,711,622 issued June 28, 1955.

It is desirable, if not essential, in these machines to provide guards or shields at the ends of the rolls. These shields help protect the rolls from coming into contact with the ground and prevent crop material from wrapping around the roll shafts and bearings.

One problem with machines currently on the market is that crop material sometimes catches on the roll guards in such position that the rolls cannot grasp it. This material catches other material, thus causing a build up of crop material in front of the rolls. The operator periodically must then stop and clear away this accumulation of crop material. This is an undesirable delay in the crop conditioning operation; but failure to clear away this material usually results in one of three occurrences. The material may accumulate in front of the rolls until it bridges the full width thereof. The conditioner then merely pushes the material along ahead of it. However, it is unusual for material to accumulate to this extent. It is more likely that the material will build up for some time and then suddenly be caught by the rolls and drawn therebetween. This results in an overloading of the rolls and sometimes produces failure of some part of the machine (usually a shear bolt provided for such occurrences). Still another result may occur if none of the accumulated material finds its way between the rolls. The material may build up in front of the machine until the entire machine merely rides over it, leaving a large wad of unconditioned crop material lying in the field.

Applicants have discovered that each of the above situations may result at least in part, and often entirely, from the interruption of the smooth continuous flow of material to, and through, the rolls at their ends because of the presence of conventional roll shields.

It is an object of this invention to provide a simple improved roll shield for a hay conditioner.

It is another object of this invention to provide a shield which will protect the rolls of a hay conditioner from damage due to contact with the ground.

It is another object of this invention to provide a shield for the rolls of a hay conditioner which will prevent crop material from wrapping around the shafts and bearings of the rolls.

It is a primary object of this invention to provide a roll shield for a hay conditioner which will fulfill the above objects while additionally facilitating the smooth continuous flow of crop material to the rolls.

Another object of this invention is the provision of an improved roll shield on a hay conditioner which is of rugged construction, inexpensive to manufacture and which can be easily substituted for conventional shields on existing machines.

In the drawings:

FIG. 1 is a fragmentary side elevational view of a hay conditioner embodying the roll shield of this invention;

FIG. 2 is a fragmentary plan view of the device of FIG. 1; and

FIG. 3 is a top plan view of the roll shield alone.

The hay conditioner selected for purposes of illustrating this invention includes longitudinal frame members 10 (one shown) interconnected at the front end of the machine by a transverse tubular frame member 11. A drawbar 12 extends forwardly from member 11 substantially on the longitudinal axis of the machine, in order that the machine may be towed along ground G in the direction of the arrow 14 in FIG. 1. A vertical plate 15 is integrally connected to each longitudinal frame member 10 at the rear end thereof. The plates 15 carry the ends of a rear transverse tubular brace 16 located adjacent the upper edge of the plates. At the lower part of each plate 15 is a bearing 17 in which is journalled the stub shaft 18 of a lower combined pick-up and crusher roll 19. Ground wheels, not shown, support the rear end of the hay conditioner whereby roll 19 is maintained in close proximity to the ground, as seen in FIG. 1.

At the top forward corner of each plate 15 is journalled an upper roll supporting plate 20. Each plate 20 carries a bearing 21 in which is journalled a stub shaft 22 of an upper crusher roll 23. It will be seen in FIG. 1 that roll supports 20 may pivot in a counterclockwise direction about their mounts 24 to enable upper crusher roll 23 to move away from lower combined pick-up and crusher roll 19.

Conventional means, not shown, drives lower roll 19 in a counterclockwise direction and upper roll 23 in a clockwise direction, as seen in FIG. 1. The rolls are so disposed on the hay conditioner that their axes lie in an inclined plane P which forms an acute angle with the ground G on the material engaging side of the rolls. Portions of the peripheries of rolls 19 and 23 define a wedge-shaped bite at 25 whose vertex lies substantially in plane P. Bite 25 diverges forwardly and downwardly from plane P and receives crop material delivered thereinto by lower roll 19 as the hay conditioner moves across a field of cut crop material. The material passes between the rolls and falls to the ground behind the machine after having been crushed during the process of passing between the rolls. To facilitate an aggressive pick-up and feeding action by lower roll 19, a coating 26 (see FIG. 2) of rubber or other friction material may be provided on the periphery thereof.

In order to protect roll 19 from damage due to contact with the ground, a fore-and-aft extending shield 28 is provided. Formed integrally with shield 28, at the rear end thereof, is a mounting lug 29 adapted to be attached to some portion (such as vertical plate 15) of the frame of the hay conditioner by a nut and bolt 30. The forward end of shield 28 is provided with a mounting lug 31 which may be attached to frame member 10 by bolt and nut 32 forwardly of upper roll 23. A first portion 33 of shield 28 is concentric with and in close proximity to the periphery of a segment of roll 19. The segment of roll 19 encircled by portion 33 of the shield includes at least the lower forward quadrant of the roll as defined by a vertical plane V and a horizontal plane H which intersects on the axis of lower roll 19 (see FIG. 1). A second portion 34 of guard 28 is concentric with and in close proximity to the segment of the upper roll 23 which defines the upper side of bite 25. Portions 33 and 34 of guard 28 extend into the bite 25 defined by the crusher rolls and, in effect, define a second bite which is parallel to the bite between the crusher rolls.

As a result of this close relationship between guard 28 and rolls 19 and 23 at the roll bite, crop material may easily be pulled into the rolls around guard 28. As the machine moves across a field, material in line with guard 28 flows into the bite defined by portions 33 and 34 and is therefore in position to be grasped by the bite portions of rolls 19 and 23. It will also be clear from FIGURES 1 and 2 that shield 28 is very effective to prevent material from wrapping around shafts 18 and 22 of rolls 19 and 23 since it is concentric with and in close proximity to relatively large segments of the peripheries of these rolls on the material engaging side thereof. While only one shield, or guard, 28 has been shown and described, it is to be understood that one such guard is employed at each end of the crop treating rolls.

Prior to this invention, the protection of hay conditioner rolls and the prevention of material wrapping about the shafts thereof was realized only at considerable hinderance to smooth continuous movement of material into the rolls. This frequently resulted in bridging of the material which required stopping of the crushing operation. Applicants' roll-guard relationship has proven highly successful in preventing crop material from wrapping about the shaft of the crusher rolls as well as in preventing clogging of the machine. The result is fewer interruptions of the conditioning operation to clear clogged rolls or replace broken shear bolts resulting from roll overloading.

While this invention has been described in connection with a particular embodiment thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A hay conditioner comprising a mobile frame adapted to be moved along the ground in a forward direction, a first hay conditioning roll mounted on said frame and having a horizontal axis extending transverse to the direction of travel of said frame, a second hay conditioning roll mounted on said frame parallel to said first roll and disposed generally forwardly and above said first roll whereby a plane through the axes of said rolls forms an acute angle with the horizontal on the forward side of the rolls, an arcuate segment of the periphery of said first roll and an arcuate segment of the periphery of said second roll defining therebetween a material receiving bite which opens downwardly and forwardly from said plane and has a vertex lying substantially in said plane, the periphery of said first roll lying in close proximity to the ground to pick up cut crop material therefrom and deliver said material upwardly over said first roll and into said bite, an elongated roll guard member mounted on said frame and extending generally in the direction of travel of the frame at at least one end of said rolls, said guard member having a first portion generally concentric with and in close proximity to said arcuate segment of said first roll, said guard member having a second portion generally concentric with and in close proximity to said arcuate segment of said second roll, said portions of the guard member extending into and joining each other adjacent the material receiving bite of said rolls and allowing free movement of crop material into grasping proximity of the roll bite.

2. A hay conditioner as recited in claim 1 wherein said first and second portions of the guard member join each other adjacent the bite of said rolls in a rounded vertex which is spaced perpendicularly from said plane through the axis of said rolls a distance less than the radius of said first roll.

3. A hay conditioner as recited in claim 1 wherein said first portion of the guard member is concentric with and in close proximity to at least a ninety degree segment of the periphery of said first roll, said ninety degree segment of the first roll being the lower forward quadrant of the roll as defined by a vertical plane and a horizontal plane intersecting on the axis of said first roll.

4. A hay conditioner as recited in claim 1 wherein said elongated roll guard member has one end mounted on said frame rearwardly of said first roll and the other end mounted on said frame forwardly of said second roll, said guard member extending underneath said rolls and having a generally semi-circular portion, including said first portion, said semi-circular portion extending generally concentric with and in close proximity to a semi-circular segment of the periphery of said first roll, said semi-circular segment of the periphery of said first roll being the portion of the roll at one end thereof lying below a horizontal plane through the axis of the roll.

References Cited in the file of this patent
UNITED STATES PATENTS
2,711,622   Cunningham _____ June 28, 1955